(12) United States Patent
Schwarzkopf et al.

(10) Patent No.: US 9,272,611 B2
(45) Date of Patent: Mar. 1, 2016

(54) SEALING STRAND FOR ADHESIVELY BONDING TO A VEHICLE BODY

(71) Applicant: CQLT SaarGummi Technologies S.à.r.l., Remich (LU)

(72) Inventors: Roman Schwarzkopf, Eppelborn (DE); Martin Thome, Schmelz-Limbach (DE); Michael Wczulek, Schoden (DE); Andreas Holz, Kirchheim (DE)

(73) Assignee: CQLT SaarGummi Technologies S.à.r.l., Remich (LU)

( * ) Notice: Subject to any disclaimer, the term of this patent is extended or adjusted under 35 U.S.C. 154(b) by 0 days.

(21) Appl. No.: 14/414,181

(22) PCT Filed: Jul. 11, 2013

(86) PCT No.: PCT/EP2013/064640
§ 371 (c)(1),
(2) Date: Jan. 12, 2015

(87) PCT Pub. No.: WO2014/009448
PCT Pub. Date: Jan. 16, 2014

(65) Prior Publication Data
US 2015/0151621 A1    Jun. 4, 2015

(30) Foreign Application Priority Data
Jul. 13, 2012   (DE) .................. 10 2012 106 340

(51) Int. Cl.
*E06B 7/16*         (2006.01)
*B60J 10/00*        (2006.01)

(52) U.S. Cl.
CPC .......... *B60J 10/0071* (2013.01); *B60J 10/0065* (2013.01); *B60J 10/0074* (2013.01)

(58) Field of Classification Search
CPC . B60J 10/0071; B60J 10/0065; B60J 10/0074
USPC ................. 49/475.1, 482.1, 498.1, 490.1
See application file for complete search history.

(56) References Cited

U.S. PATENT DOCUMENTS 4,617,220 A * 10/1986 Ginster ................... 428/122
4,976,068 A * 12/1990 Keys ...................... 49/482.1
5,449,544 A    9/1995 Ogawa et al.

(Continued)

FOREIGN PATENT DOCUMENTS

DE    28 42 207 A1    4/1979
DE    29 24 574 A1    1/1980

(Continued)

OTHER PUBLICATIONS

International Search Report of PCT/EP2013/064640, mailed Aug. 29, 2013.

(Continued)

*Primary Examiner* — Jerry Redman
(74) *Attorney, Agent, or Firm* — Collard & Roe, P.C.

(57) ABSTRACT

A sealing strand for adhesively bonding to a vehicle body, in particular to a body flange protruding from a vehicle body, uses a device for attaching the sealing strand to the vehicle body, in particular to the body flange, prior to the adhesive bonding. In particular, the device for attaching the sealing strand in a starting position is used for the adhesive bonding with the aid of an application device which exerts contact pressure.

7 Claims, 2 Drawing Sheets

(56) References Cited

U.S. PATENT DOCUMENTS

| | | | |
|---|---|---|---|
| 5,538,317 | A | 7/1996 | Brocke et al. |
| 6,820,372 | B2 * | 11/2004 | Nozaki .................. 49/498.1 |
| 7,422,788 | B2 * | 9/2008 | Hahn et al. ............. 428/313.3 |
| 8,225,554 | B2 * | 7/2012 | Nozaki .................. 49/498.1 |
| 2001/0005960 | A1 * | 7/2001 | Yamaguchi et al. ...... 49/489.1 |
| 2001/0054261 | A1 * | 12/2001 | Nozaki et al. ........... 49/498.1 |
| 2004/0144036 | A1 * | 7/2004 | Heyden et al. .......... 49/498.1 |
| 2004/0255520 | A1 * | 12/2004 | Baratin et al. ........... 49/498.1 |
| 2004/0261322 | A1 * | 12/2004 | Baratin et al. ........... 49/498.1 |
| 2006/0024472 | A1 * | 2/2006 | Losch .................... 428/99 |
| 2006/0143988 | A1 * | 7/2006 | Dillmann ................ 49/498.1 |
| 2007/0000180 | A1 | 1/2007 | Oba et al. |
| 2007/0024084 | A1 * | 2/2007 | Oba et al. ................ 296/146.9 |
| 2007/0180776 | A1 * | 8/2007 | Oba et al. ................ 49/498.1 |
| 2007/0199247 | A1 * | 8/2007 | Oba et al. ................ 49/498.1 |
| 2007/0221323 | A1 | 9/2007 | Oba et al. |
| 2007/0245634 | A1 * | 10/2007 | Oba et al. ................ 49/498.1 |
| 2007/0251153 | A1 * | 11/2007 | Oba et al. ................ 49/498.1 |

FOREIGN PATENT DOCUMENTS

| | | | |
|---|---|---|---|
| DE | 33 46 070 | A1 | 8/1985 |
| DE | 38 24 088 | A1 | 1/1990 |
| DE | 43 18 719 | A1 | 12/1993 |
| DE | 43 08 218 | A1 | 9/1994 |
| DE | 102008011397 | * 8/2009 | ............... F16J 15/32 |
| GB | 2 024 294 | A | 1/1980 |
| GB | 1 597 127 | A | 9/1981 |
| JP | 2001-151035 | A | 6/2001 |
| JP | 2008279884 | A * | 11/2008 |
| WO | 2013/040573 | A1 | 3/2013 |

OTHER PUBLICATIONS

German Search Report in 10 2012 106 340.0, dated May 15, 2013, with English translation of relevant parts.

\* cited by examiner

SEALING STRAND FOR ADHESIVELY BONDING TO A VEHICLE BODY

CROSS REFERENCE TO RELATED APPLICATIONS

This application is the National Stage of PCT/EP2013/064640 filed on Jul. 11, 2013, which claims priority under 35 U.S.C. §119 of German Application No. 10 2012 106 340.0 filed on Jul. 13, 2012, the disclosure of which is incorporated by reference. The international application under PCT article 21(2) was not published in English.

BACKGROUND OF THE INVENTION

1. Field of the Invention

The invention relates to a sealing strand for adhesive attachment to a vehicle body, particularly to a body flange projecting away from the vehicle body.

2. Description of the Related Art

It is known that seals on vehicle, for example door seals, are formed by means of sealing strands that can be set onto a flange projecting away from the vehicle body, using a U-shaped attachment section. Alternatively, the seal is adhesively attached to the flange or to a body region adjacent to the flange.

SUMMARY OF THE INVENTION

The invention is based on the task of creating a new sealing strand intended for adhesive attachment to the vehicle body, which strand can be conveniently mounted on the vehicle.

The sealing strand according to the invention that accomplishes this task is characterized by means for tacking the sealing strand to the vehicle body.

It is advantageous that such a sealing strand can be affixed on the vehicle body, before being adhesively attached, so that it is held on its own there and, in particular, is sufficiently fixed in place in a starting position for the adhesive attachment process. During the adhesive attachment process, it is not necessary to exert any holding forces while orienting the sealing strand to be adhesively attached.

In a preferred embodiment of the invention, the stated means are means for tacking the sealing strand to the body flange. In particular, the stated means have devices for the production of a clamping connection of the sealing strand to the body flange.

It is practical if the sealing strand can be set onto the body flange with the production of a clamping connection transverse to the longitudinal axis of the strand. In particular, the devices for the production of the clamping connection have a clamping shank disposed in clip-type manner relative to an adhesive surface of the sealing strand, for this purpose. It is advantageous if the body flange is automatically clamped in between the adhesive surface and the clamping shank when the sealing strand is set onto the body flange, with the production of a holding force for the sealing strand. It is understood that in this state, the adhesive surface does not yet act in adhesive manner, and that a double-sided adhesive tape that might be used for the adhesive attachment is still covered by a protective film.

It is practical if the sealing strand has a stop that is decisive for the desired tacking position, particularly for the starting position of the adhesive attachment process, against which stop the free end of the body flange preferably lies.

In a further embodiment of the invention, the stated clamping shank is connected with the remainder of the sealing strand by way of a crosspiece-like bridge that forms a planned breaking point. It is advantageous that if necessary, the clamping shank can be pulled off after complete installation of the sealing strand, by tearing the planned breaking point apart.

In a further embodiment of the invention, the clamping shank can be connected with a covering lip of the sealing strand that extends in an arc over the clamping surface, whereby preferably, the clamping shank can be torn off from the adhesively attached sealing strand, with orientation of the covering lip in a covering position.

Preferably, a double-sided adhesive tape having a protective film, which can be pulled off using the application device stated initially, if necessary, serves for the adhesive attachment.

BRIEF DESCRIPTION OF THE DRAWINGS

The invention will be explained in greater detail in the following, using exemplary embodiments and the attached drawings that relate to these exemplary embodiments. These show.

DETAILED DESCRIPTION OF THE PREFERRED EMBODIMENTS

Figure 1:
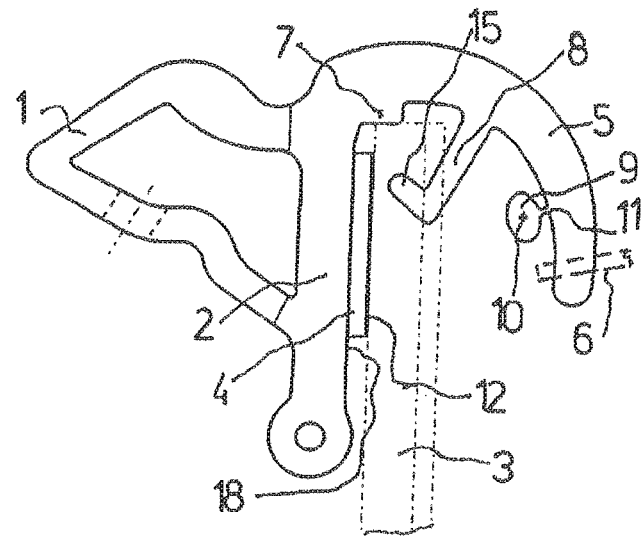
FIG. 1 a first exemplary embodiment of a sealing strand according to the invention, having a clamping shank demonstrating an angular deflection, FIG. 2 an exemplary embodiment of a sealing strand according to the invention, having a clamping shank that can be torn off from a covering lip, FIG. 3 an exemplary embodiment of a sealing strand according to the invention, having a covering lip that simultaneously forms a clamping shank, FIG. 4 a further exemplary embodiment of a sealing strand according to the invention, having a clamping shank that can be torn off, FIG. 5 a representation that explains the installation of the sealing strands according to the invention.

A sealing strand having a sealing section 1 and an attachment section 2 consisting or a harder elastomer material than the sealing section serves for forming a seal on a vehicle door and is intended to be adhesively attached to a body flange 3 that runs around the circumference of a door opening. The adhesive attachment of the attachment section 2 to the flange 3 takes place using a double-sided adhesive tape 4 adhesively attached to an adhesive surface 18 of the attachment section 2, which tape has a protective film 12.

A covering lip 5 that runs in an arc over the attachment section, angled away from the latter, extends from the attachment section 2; this lip lies against the edge of a body part 6 in the completely installed status of the sealing strand, and covers a gap between the body flange 3 and the body part 6.

A projection 7 at the foot of the covering lip 5 forms a stop for the free end of the body flange 3.

A shank 8 having an angular deflection 15 extends from the covering lip 5, whereby the shank 8 engages on the body flange 3 opposite the attachment section 2 or the adhesive tape 4 in the manner of a pliers shank.

Furthermore, a rubber string 9 having an embedded tear-resistant thread 10 is connected with the covering lip 5, whereby the rubber string is connected with the covering lip 5 by way of a crosspiece 11 that forms a planned breaking point.

To install the sealing strand shown in FIG. 1, with adhesive attachment to the body flange 3 by means of the adhesive tape 4, the sealing strand is at first only tacked onto the vehicle body and, for this purpose, set onto the body flange 3 until the free end of the body flange 3 makes contact with the projection 7. The shank 8 connected with the covering lip 5 ensures clamping of the sealing strand to the body flange 3, the side of which, facing the attachment section 2, lies against the adhesive tape 4. The adhesive tape 4 is still covered with the protective film 12 in this tacked state.

Figure 5:
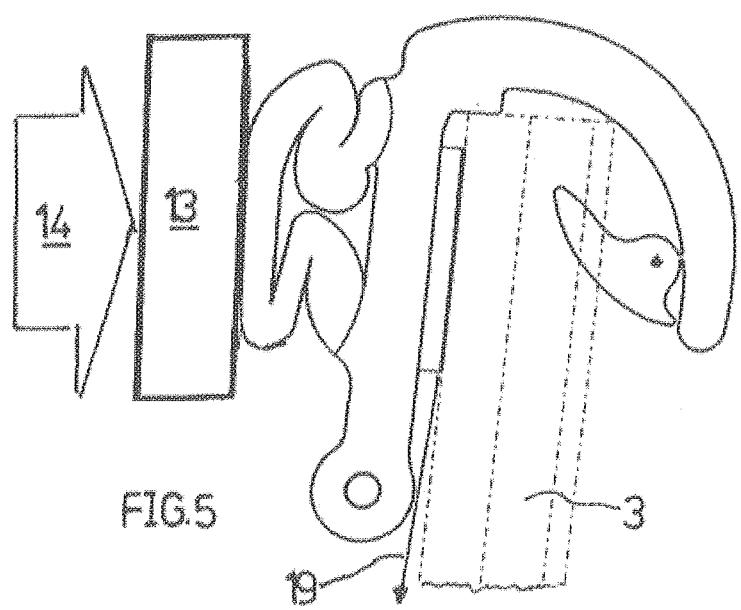

The sealing strand is now in a starting position for adhesive attachment to the body flange 3, using an application device 13 reproduced schematically in FIG. 5. A press-down pressure according to arrow 14, which ensures adhesive attachment, is produced by way of the application device 13, with the sealing section 1 of the sealing strand being folded together. If necessary, production of the press-down pressure takes place continuously by means of a roller or a slide shoe. In any case, the application device 13 comprises means for pulling the protective film 12 off from the adhesive tape 4 before the adhesive attachment process, according to the arrow 19, whereby these means can comprise a pull-off roller (not shown) that precedes the application device, for example.

After the sealing strand has been adhesively attached to the body flange 3, the rubber string 9 is pulled off, in a final work step, with continuous tearing of the crosspiece 11 that is configured as a planned breaking point, and the covering lip 5 is thereby brought into the planned veneering position, with contact against the body part 6. If necessary, pulling the rubber string 9 off takes place automatically, using the application device 13, for example together with pulling off the protective film 12.

In the following exemplary embodiments, shown in FIGS. 2 to 4, the same parts or parts having the same effect are indicated with the same reference number as in FIG. 1, whereby the letter a, b or c is appended to the reference number in question.

Figure 2:
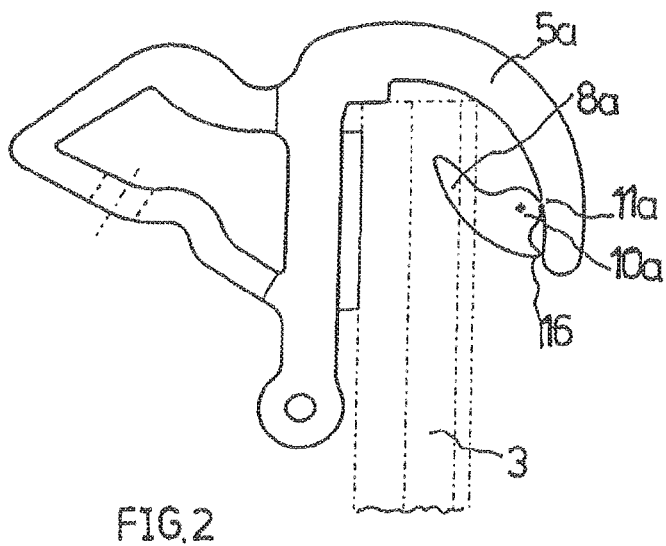

In the exemplary embodiment of FIG. 2, a shank 8a that projects away from a covering lip 5a, which shank serves for a clamping connection of the sealing strand shown with a body flange 3, simultaneously forms an installation string for positioning of the covering lip 5a in a covering position. Accordingly, a tear-resistant thread 10a has been set into the shank 8a, and the shank stands in connection with the covering lip 5a by way of a crosspiece 11a. A projection 16 that projects away from the shank 8a supports the transfer of a clamping force to the body flange 3. Pulling the shank 8a off takes place, if necessary, by way of a pull-off device that follows the application device 13.

Figure 3:
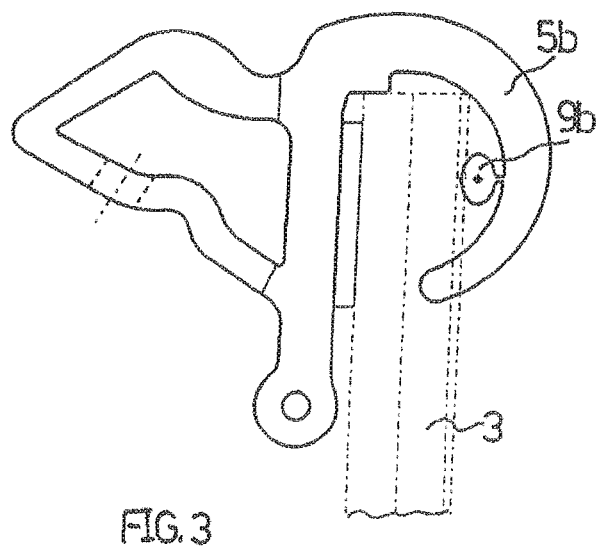

In the exemplary embodiment shown in FIG. 3, a covering lip 5a itself forms a clamping shank that tacks the sealing strand onto the flange 3. Using a tear-off string 9b, the covering lip 5b can be brought into its intended position after the sealing strand has been adhesively attached.

Figure 4:
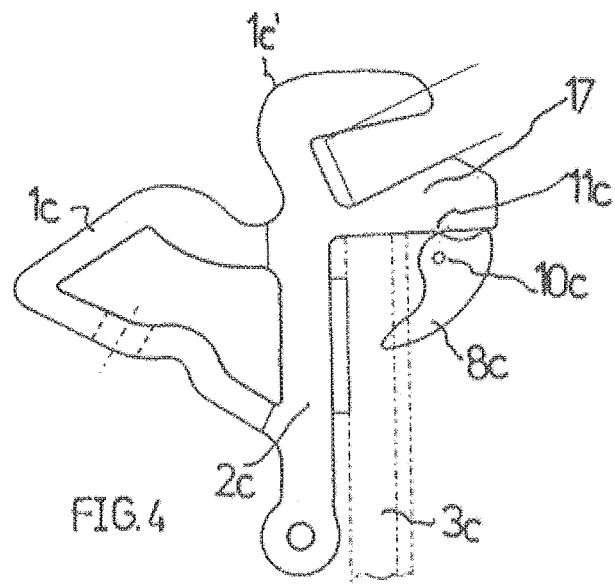

In a sealing strand shown in FIG. 4, an attachment section 2c is connected with two sealing sections 1c and 1c', and has an angular deflection 17 that forms a stop for the free end of a body flange 3c. A shank 8c that projects away from the stop, which shank serves for clamping the sealing strand to the body flange 3c, is connected with the angular deflection 17 by way of a crosspiece 11c that forms the planned breaking point, and a tear-resistant thread 10a for pulling the shank 8a off after installation of the sealing strand has taken place is formed in the shank 8a.

The invention claimed is:

1. A sealing strand for adhesive attachment to a body flange projecting away from a vehicle body, comprising an attachment section, an adhesive surface, a covering lip extending from the attachment section at an angle to the adhesive surface in an arc over the adhesive surface, and a clamping shank connected with or formed by the covering lip or an angled-away part that stands at an angle relative to the adhesive surface for clamping the sealing strand to the body flange before adhering the sealing strand to the vehicle body in an adhesive attachment process, wherein the clamping shank projects away from the covering lip and lies against the body flange directly opposite the adhesive surface, and wherein the body flange is clamped in place between the adhesive surface and the clamping shank to produce a self-holding tacking connection of the sealing strand to the body flange.

2. The sealing strand according to claim 1, wherein the clamping is configured for clamping the sealing strand to the vehicle body in a starting position for the adhesive attachment process, using an application device comprising a roller or a slide shoe that exerts a pressure against the sealing strand.

3. The sealing strand according to claim 2, wherein the sealing strand has a stop that sets the starting position.

4. The sealing strand according to claim 2, wherein a double-sided adhesive tape is provided for adhesive attachment of the sealing strand to the vehicle body in the adhesive attachment process, and the application device comprises a tearing device for tearing off a protective film from the adhesive tape.

5. The sealing strand according to claim 1, wherein the sealing strand can be set onto the body flange with the self-holding tacking connection produced in a direction transverse to a longitudinal axis of the sealing strand.

6. The sealing strand according to claim 1, wherein the clamping shank is connected with a non-adhesive surface of the sealing strand by way of a crosspiece forming a planned breaking connection.

7. The sealing strand according to claim 1, wherein the clamping shank can be torn off from the sealing strand adhesively attached to the body flange when the covering lip is disposed in a covering position.

* * * * *